Sept. 11, 1956  G. B. ENTZ  2,762,631
MECHANISM FOR RAISING AND LOWERING FRAMES OF TRAILERS
WITH RESPECT TO GROUND WHEELS THEREOF
Filed Nov. 2, 1953  2 Sheets-Sheet 1
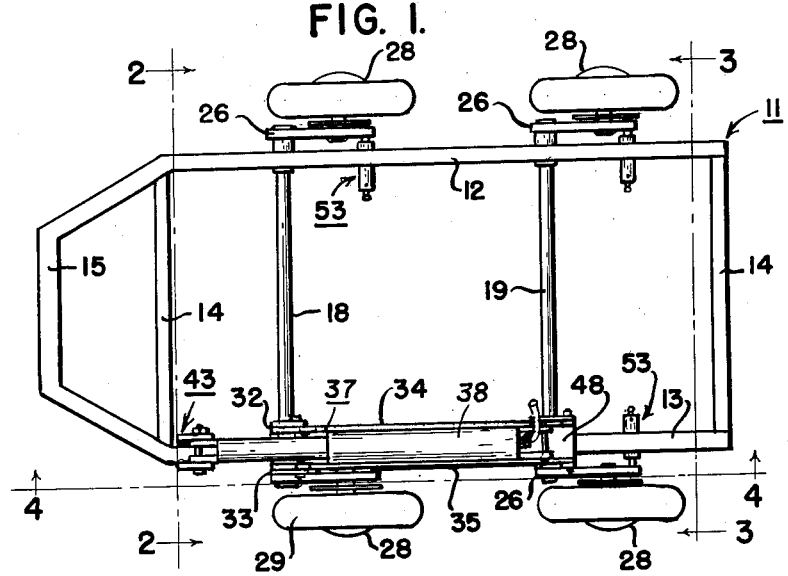
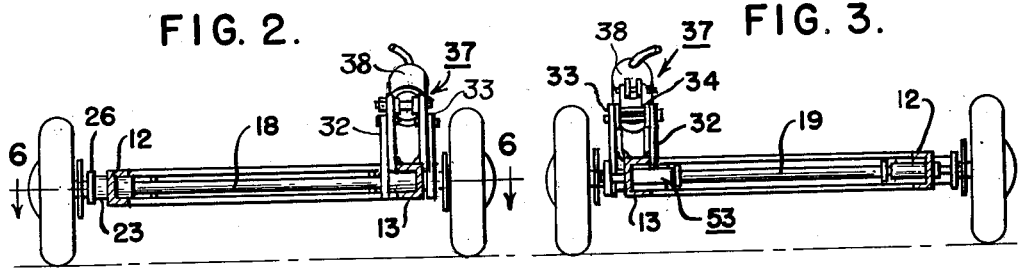
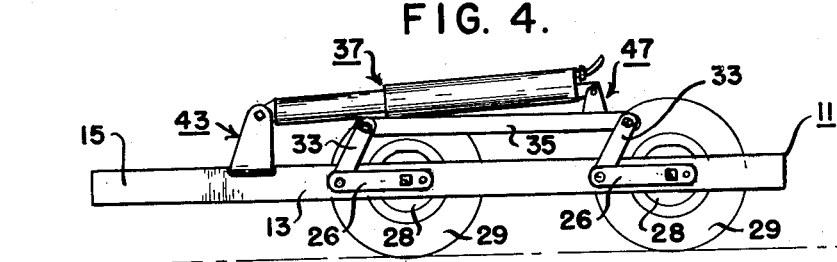
INVENTOR
Gerhard B. Entz
BY Lancaster, Allwine Rommel
ATTORNEYS

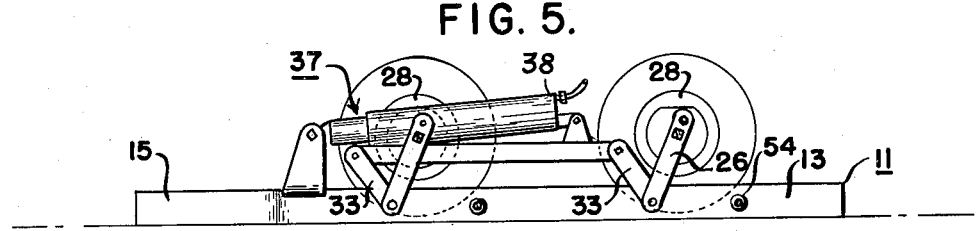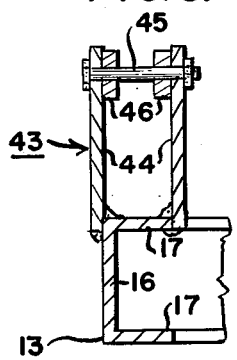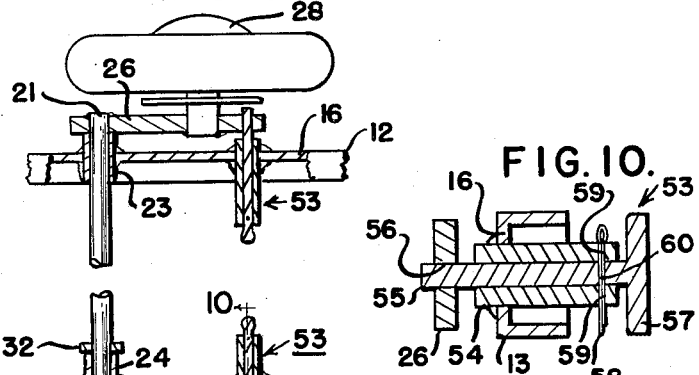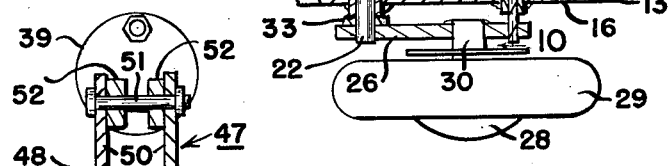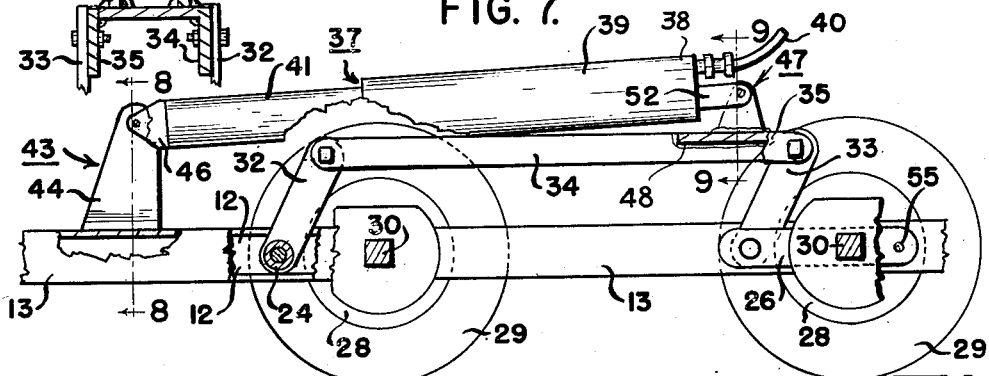

United States Patent Office 2,762,631
Patented Sept. 11, 1956

2,762,631

MECHANISM FOR RAISING AND LOWERING FRAMES OF TRAILERS WITH RESPECT TO GROUND WHEELS THEREOF

Gerhard B. Entz, Oklahoma City, Okla.

Application November 2, 1953, Serial No. 389,753

5 Claims. (Cl. 280—44)

This invention relates to trailers and more particularly to such embodying mechanism for raising and lowering the frames thereof, and the load carried thereby, with respect to the ground wheels of the trailers.

The invention is particularly well adapted for use (although not limited to such use), in the transportation and support, while in use, of heavy machinery, such as stone cutting machines of the general character shown in Patent 2,152,193 of March 28, 1939, to Paul M. Johanning. A machine of this character frequently weighs over 4000 pounds and it has been found desirable to secure them to the chassis frames of trailers so that the machines may be moved from time to time, about the stone quarry, in close proximity to the workings or convenient delivery stations in or near the quarry to which the slabs of stone to be cut into smaller stones, is hauled on trucks or other transportation means. It is also found desirable, at times, to transport the stone cutting machines to the building sites for the cutting of the slabs of stone into smaller stones used at the particular building site in the erection of walls.

The principal objects of the present invention are to provide a trailer which is simple in construction, easy to maintain in good repair and sufficently sturdy to transport heavy machinery which itself is sturdy because of the shocks to which it is subjected while in use, and hence does not require the riding comfort required in connection with light trailers and those trailers intended for the transportation of fragile merchandise.

Another object is to provide a trailer in which a relatively wide chassis frame is devoid of operating parts above one of its longitudinally extending side members so that the load may be disposed partly thereon and overhanging in close proximity to the ground wheels laterally of such side member and to dispose the hydraulic mechanism (for lifting and lowering the chassis with respect to the ground wheels), over and connected with the other longitudinally extending side member and above which mechanism, parts of the load may extend.

Other objects and advantages will appear in the following description of a practical embodiment of my invention, taken in connection with the accompanying drawings forming a part of this specification, and in which drawings:

Fig. 1 is a top plan view of the trailer, with the parts in position for travel over the ground.

Figs. 2 and 3 are transverse vertical sectional views on the lines 2—2 and 3—3, respectively of Fig. 1.

Fig. 4 is a longitudinal vertical sectional view on the line 4—4 of Fig. 1.

Fig. 5 is a view similar to Fig. 4, but showing the chassis of the trailer resting upon the ground.

Fig. 6 is an enlarged, fragmentary, horizontal sectional view on the line 6—6 of Fig. 2.

Fig. 7 is an enlarged, fragmentary, side vew partly in elevation and partly in vertical section of the trailer, parts being broken away to disclose preferred details.

Figs. 8 and 9 are enlarged vertical sectional views on the lines 8—8 and 9—9 of Fig. 7.

Fig. 10 is an enlarged sectional view on the line 10—10 of Fig. 6.

The trailer, in the example shown, includes an elongated chassis frame 11, including longitudinally extending side members 12 and 13, suitable cross members 14 and an angular front hitch portion 15 which may carry a member of any suitable tractor hitch device, not shown in the drawing. The members 12 and 13 may each be of any suitable construction or fromation to sustain the load, but in the example shown are each of channel formation arranged so as to present a vertical web 16 and inwardly directed horizontal flanges 17.

Revolubly carried side members 12 and 13 are front and rear parallel cross shafts 18 and 19, respectively each shaft having a portion 21 projecting beyond the outer face of side member 12 and a portion 22 extending beyond the outer face of side member 13, as shown in Fig. 6. In the example shown these shafts are supported in suitable short bearing tubes 23 and 24 extending through and welded to the webs 16 of the members 12 and 13, respectively.

Secured to each of the projecting portions 21 and 22 is a radial support arm 26, these arms being parallel and movable by their respective shafts 18 and 19, from positions parallel with or the long way of the side members 12 and 13, as shown in Figs. 1–4, to positions extending diagonally and upwardly as shown in Fig. 5, and vice versa.

Four sturdy ground wheels 28 are provided, preferably provided with pneumatic tires 29, one for each arm 26 and carried thereby, as by stub axle 30, extending outwardly from the free end portion of its respective arm.

For the purpose of rotating the shafts 18 and 19 simultaneously in the same direction, leaving the chassis frame free of operating parts above the longitudinally extendng side member 12 (for the purpose hereinbefore set forth), and utilizing the sturdy, longitudinally extending, side member 13 as a support and reaction member, I associate with this side member 13, inner radial actuating levers 32 and outer radial actuating levers 33 secured, as by welding, to the extending portions 22 of shafts 18 and 19, these levers 32 and 33 being parallel, extending upwardly from their respective shafts to a zone above the member 13 as shown in Figs. 1–5 and disposed at opposite sides of the member 13, as shown in Figs. 2, 4 and 7; parallel links 34 and 35 connecting the free end portions of levers 32 and 33, respectively; and means 37 carried by the chassis side member 13 for reciprocating the links 34 and 35 simultaneously.

The means 37, in the example shown comprises hydraulic mechanism 38 including a cylinder member 39, closed at one end except for a conduit 40 for the hydraulic fluid, and a piston member 41 operating therein, this mechanism 38 being located above the chassis side member 13; a means 43, such as upstanding, parallel brackets 44 welded to the member 13, and a cross rod 45 carried by the upper end portions of the brackets and extending through apertures in lugs 46 on the outer end of piston member 41, for pivotally connecting the member 41 to the member 13; and means 47, such as a cross plate 48 welded to the parallel links 34 and 35 adjacent the actuating levers 32 and 33 on the rear cross shaft 19, upstanding parallel brackets 50 welded to the upper face of plate 48, and a cross pin 51 extending through apertures in lugs 52 extending rearwardly from cylinder member 39.

This arrangement of means 37 is very sturdy and efficient since it does not require cutting through the flanges 17 of the chassis side members 13 which acts as a reaction member between means 43 and the bearing tubes 24.

In order to not depend on the means 37 to retain the ground wheels 28 in position for supporting the chassis 11 for travel over the ground, as shown in Figs. 4 and 7, such as to not depend on the maintenance of fluid under pressure in cylinder member 39, I provide means 53 carried by the chassis and operatively engaging the support arms 26 releasably retaining them the long way of the side members 12 and 13. This means, which may be provided in association with each support arm 26, and as shown more in detail in Fig. 10, preferably comprises a tube 54 secured to and extending crosswise the respective chassis side member 12—13, preferably extending through and welded to the web 16 thereof; and a removable pin 55 received partly in the tube 54 and partly in an aperture 56 in the respective support arm 26, the aperture being located at a point spaced from its respective cross shaft 18 or 19, as the case may be. I prefer to provide the pin 55 with a handle 57, such as a cross bar at its end portion which, when in use may be located inwardly of side member of the chassis frame. As a further safety measure I prefer to also provide a cotter pin 58 or similar device, extending through aligned apertures 59 and 60 in the tube 54 and pin 55.

It is believed the operation of the means for lifting and lowering the chassis frame, and the load carried upon same, with respect to the ground wheels, is clear from the foregoing description. However, it is pointed out that while certain features of the invention are applicable to trailers for supporting light loads, the present invention is primarily intended for use in transporting heavy loads, several tons in weight, which tend to swing from side to side when traveling along roads and around curves, so that dependence is placed mainly on the pneumatic tires to reduce vibration and without the use of springs. Also it is essential that the chassis frame be supported in at least four ground wheels, so there will be no possibility of its tilting downwardly at its forward or rearward end when detached from the towing motor vehicle. The present invention provides an arrangement whereby, upon introduction of fluid under pressure into the cylinder member 39, the chassis frame and its load may be evenly lifted from its position shown in Fig. 5 (which is the position suitable for using a stone cutting machine of the character previously referred to, mounted on the chassis) to a position shown in Fig. 4, which is the traveling position. By use of the hydraulic means 37, upon release of some of the fluid under pressure in cylinder member 39 the chassis may be lowered and held in a position intermediate to those shown in Figs. 4 and 5, such as to better judge the size of and subsequently place chocks for leveling the chassis on uneven ground. After loosely placing of such chocks in position, the chassis may be slowly and evenly lowered to a level position for operation of the stone cutting machine secured upon the chassis frame.

I claim:

1. In a trailer of the character described, the combination of an elongated chassis frame including longitudinally extending side members; front and rear parallel cross shafts extending transversely of and carried by said side members and having portions projecting beyond outer faces thereof; a radial support arm secured to each projecting portion of said cross shafts, said arms being parallel and movable by said shafts from positions the long way of said side members, to positions extending diagonally and upwardly with respect thereto and vice versa; ground wheels carried by the free end portions of said support arms; actuating levers secured to each of said shafts and located at opposite sides of one of said chassis side members, said actuating levers being parallel and extending upwardly from their respective shafts, to a zone above said last mentioned chassis side member; a pair of parallel links connecting the free end portions of said actuating levers located at each side of said last mentioned chassis side member; and means connected to said last mentioned member and to said links and extending above the latter in a vertical plane between and parallel to said links for reciprocating said links simultaneously.

2. In a trailer of the character described, the combination of an elongated chassis frame including longitudinally extending side members; front and rear parallel cross shafts extending transversally of and carried by said side members and having portions projecting beyond the outer faces thereof; a radial support arm secured to each projecting portion of said cross shafts, said arms being parallel and movable by said shafts from positions the long way of said side members, to positions extending diagonally and upwardly with respect thereto and vice versa; ground wheels carried by the free end portions of said support arms; an actuating lever secured to each of said shafts and located at opposite sides of one of said chassis side members, said actuating levers being parallel and extending upwardly from their respective shafts to a zone above said last mentioned chassis side member; a pair of parallel links connecting the free end portions of said actuating levers at each side of said last mentioned chassis side member; a hydraulic mechanism comprising a cylinder member and a piston member operating therein and extending above said links in a vertical plane between and parallel thereto; means pivotally connecting one of said members of said hydraulic mechanism to said last mentioned chassis side member; and means pivotally connecting the other of said members of said hydraulic mechanism to said links.

3. In a trailer of the character described, the combination of an elongated chassis frame including longitudinally extending side members; front and rear parallel cross shafts extending transversally of and carried by said side members and having portions projecting beyond the outer faces thereof; a radial support arm secured to each projecting portion of said cross shafts, said arms being parallel and movable by said shafts from positions the long way of said side members, to positions extending diagonally and upwardly with respect thereto and vice versa; ground wheels carried by the free end portions of said support arms; an actuating lever secured to each of said shafts and located at opposite sides of one of said chassis side members, said actuating levers being parallel and extending upwardly from their respective shafts to a zone above said last mentioned chassis side member; a pair of parallel links connecting the free end portions of said actuating levers at each side of said last mentioned chassis side member; a hydraulic mechanism comprising a cylinder member and a piston member operating therein and extending above said links in a vertical plane between and parallel thereto; means pivotally connecting one of said members of said hydraulic mechanism to said last mentioned chassis side member; means pivotally connecting the other of said members of said hydraulic mechanism to said links, and releasable means carried by said chassis side members and operatively engaging said support arms retaining them the long way of said side members when the ground wheels are in position for supporting the chassis for travel over the ground.

4. The trailer as specified in claim 2 in which said last mentioned means comprises a cross plate secured to said links and an upstanding bracket carried by said plate with which the member of the hydraulic mechanism has pivotal connection.

5. The trailer as specified in claim 3 in which said last mentioned means comprises a tube carried by the chassis frame crosswise the same with its axis intersecting the adjacent support arm, when extending the long way of the adjacent chassis side member, at a point spaced from the respective cross shaft of the arm, at which point the arm is provided with an aperture, and a removable pin received partly in said tube and partly in said aperture.

References Cited in the file of this patent

UNITED STATES PATENTS

| | | |
|---|---|---|
| 1,973,372 | Clapp | Sept. 11, 1934 |
| 2,227,762 | Ronning | Jan. 7, 1941 |
| 2,348,445 | Bayer | May 9, 1944 |
| 2,506,699 | Byrd | May 9, 1950 |
| 2,519,002 | Stemen | Aug. 15, 1950 |
| 2,681,811 | Green | June 22, 1954 |

FOREIGN PATENTS

| | | |
|---|---|---|
| 827,158 | Germany | Jan. 7, 1952 |